United States Patent
Leshem et al.

(10) Patent No.: US 7,636,406 B2
(45) Date of Patent: Dec. 22, 2009

(54) SYSTEM AND METHOD OF A MIMO TRANSMITTER / RECEIVER

(75) Inventors: Amir Leshem, Hod Hasharon (IL); Nir Tal, Haifa (IL)

(73) Assignee: MetaLink Ltd., Yakum (IL)

( * ) Notice: Subject to any disclaimer, the term of this patent is extended or adjusted under 35 U.S.C. 154(b) by 452 days.

(21) Appl. No.: 10/838,974

(22) Filed: May 5, 2004

(65) Prior Publication Data

US 2005/0249302 A1  Nov. 10, 2005

(51) Int. Cl.
*H04B 7/10* (2006.01)
(52) U.S. Cl. ..................... 375/347
(58) Field of Classification Search ............ 375/347
See application file for complete search history.

(56) References Cited

U.S. PATENT DOCUMENTS

| | | | |
|---|---|---|---|
| 6,377,631 B1 | 4/2002 | Raleigh | |
| 2002/0161560 A1* | 10/2002 | Abe et al. | 702/196 |
| 2003/0161258 A1 | 8/2003 | Zhang et al. | |
| 2003/0210750 A1* | 11/2003 | Onggosanusi et al. | 375/295 |

* cited by examiner

*Primary Examiner*—Shuwang Liu
*Assistant Examiner*—Michael R Neff
(74) *Attorney, Agent, or Firm*—Martin Fleit; Paul D. Bianco; Fleit Gibbons Gutman Bongini & Bianco PL

(57) ABSTRACT

A Multiple Input Multiple Output (MIMO) transmitter/receiver system has a reduced complexity decoder for receiving and decoding simultaneously several transmitted signals. The transmitter includes a space time coded modulation (STCM) block in the decoder. The transmitter/receiver system provides a reduced complexity approximation of optimal Maximum Likelihood Estimation (MLE) methods while maintaining most of the performance gain and simplifying the implementation.

4 Claims, 8 Drawing Sheets

SYSTEM AND METHOD OF A MIMO TRANSMITTER / RECEIVER

BACKGROUND OF THE INVENTION

The present invention relates to the field of transmission and reception of multiple signals using multiple transmission antennae and multiple receivers. More particularly, the invention relates to the use of multiple transmission antennae for the purpose of improving the quality of digital data communication. Recently, the use of digital communications using multiple input-multiple output (MIMO) antenna arrays has been successfully used for enhancing the transmission and reception capacity of signals. Compared with a single-input single-output (SISO) system, a MIMO system can improve this capacity by a factor of the total number of antennas.

Prior art techniques for decoding MIMO antenna arrays include the BLAST method, linear equalization, space-time coding, spatial modulation and maximum likelihood. The most notable recent use was in the BLAST (Bell-Labs Layered Space-Time) system which provides a method of decoding signals based on their received strength. The stronger signals are located and decoded. The strongest signal located by the system is then subtracted out and the next strongest signal located is decoded. This process is continued until the different signals are successively located in a layered approach. This method involves complex signal processing for determining the strongest signal. Linear equalization includes calculating a pseudo-inverse matrix for the channel matrix. Space-time coding can be used in multiple-input systems in order to reduce the power level required for data transmission at a particular data rate, while maintaining a certain error rate. Similarly, space-time coding can be used to obtain a low error rate, while maintaining a particular data rate and power level. The Spatial processing modulation method is based on multiple antenna arrays. Said modulation method improves the communication efficiency of wireless systems by decreasing the bit error rate and increasing the data rate. The maximum likelihood method includes searching all possible combinations of the received data in order to determine the sequence that is most likely to have been transmitted based on information from the received signal vector and the additive noise. However, increasing the number of antennae makes the maximum likelihood method computationally infeasible and substantially degrades the performance of linear equalization and BLAST.

Numerous attempts for reducing the computational complexity of signal processing inherent in digital data communication have been made in recent years. For example, U.S. Pat. No. 6,377,631, proposes a system which operates with an orthogonalizing signal procedure including a plurality of transmitter antenna elements, which decomposes the time domain space-time communication channel that may have inter symbol interference (ISI) into a set of parallel bins, wherein said ISI is reduced.

Another attempt to reduce the complexity of digital data communication is made in U.S. Patent Application No. 20030161258, which proposes a reduced computational complexity for the MIMO communication system, said system including a joint encoding and decoding scheme. Due to the performance of these joint operations, the calculations required increase only linearly and not exponentially according to the number of transmittal antennae.

However, none of the existing MIMO methodologies propose an improved reduced complexity maximum likelihood decoder for receiving and decoding simultaneously a plurality of transmitted signals.

It is thus an object of the invention to provide a reduced complexity MIMO decoder for receiving and decoding simultaneously a plurality of transmitted signals, wherein said computationally efficient decoder is accomplished by alleviating the computational complexity of optimal MLE methods while maintaining most of the performance gain.

SUMMARY

The present invention presents provides two methods for obtaining a plurality of received signals in a MIMO system with K transmission elements and N reception elements, wherein $N \geq K$ ($N>2$, $K>1$).

The first method comprises initial steps of obtaining the channel coefficients matrix and a plurality of K transmission channels. The next step includes decomposing said channel coefficients matrix using a WB factorization method, wherein the bandwidth of the decomposed matrix is b. In last step, an iterative process applying MLE algorithm is implemented for obtaining K received signals from all sub-sequence combinations of K transmitted signals. Said received signals are obtained according to the transmitted signal vector, which is propagated through the decomposed channel coefficients matrix, and the additive noise vector, which is propagated though the partial equalization matrix. At each iteration stage i an iterative algorithm is proposed to calculate an updated likelihood value. In addition, at each iteration stage said algorithm calculates a single reduced received signal of index $K-i$, calculated from the combination of b transmitted signals of indices i to $i+b-1$, and a sub-sequence of reduced received signals of indices $K-i+1$ to K, calculated from the combination of transmitted signals of matching indices. The method may further comprise the following steps:

In the first step the transmission channels previously obtained are sorted according to a set of criteria, said criteria being the least noise gain, least error probability or the sequential arrival order of the transmitted signals. The second step is rearranging the channel coefficients matrix according to the order of the transmitted signals.

The second method comprises steps of obtaining the channel coefficients matrix, obtaining a plurality of K transmission channels and sorting thereof according to a set of criteria, said criteria being the least error probability, maximal received signal to noise ratio or the optimal noise gain. Following the procedure of rearranging the channel coefficients matrix according to the order set for the transmission channels, the channel coefficients matrix is decomposed using a decomposing process, said decomposing process being QR factorization or WB factorization. The next step includes defining first partition matrices, which are obtained from the decomposed channel coefficients matrix. In the last step, the K received signals are obtained from the best combination of M estimated transmitted signals ($M<K$, $M>1$) of said decomposed channel coefficients matrix by applying an iterative process. Wherein at each iteration, the best combination of L out of M ($L \leq M$) estimated transmitted signals of said partition matrices are determined according to an additional set of criteria, said additional criteria being maximum likelihood estimation or maximum a-posteriori probability.

BRIEF DESCRIPTION OF THE DRAWINGS

These and further features and advantages of the invention will become more clearly understood in the light of the ensuing descriptions of the preferred embodiments thereof, given by way of example only, with reference to the accompanying drawings, wherein—

DESCRIPTION OF THE PREFERRED EMBODIMENT

The present invention provides an improved Multiple Input Multiple Output (MIMO) transmitter/receiver system in a wireless connection having a reduced complexity decoder for receiving and decoding simultaneously a plurality of transmitted signals, wherein said transmitter includes a space time coded modulation (STCM) block. The preferred embodiments can be farther implemented in conjunction with multi-carrier modulation methods, e.g. Orthogonal Frequency Division Multiplexing (OFDM) and Discrete Multi-Tone (DMT), wherein the preferred embodiment is employed at each of the system's carriers. The present invention applied according to said modulation methods yields a substantial reduction in complexity. In addition, in order to improve the performance gain the preferred embodiments can be implemented in conjunction with an outer (external??) Forward Error Correction code (FEC). The preferred embodiments may be implemented in a MIMO system using equivalent techniques for a wire-line connection as well. The transmitter/receiver system provides a reduced computational complexity implementation for applying approximate MLE methods while maintaining most of the performance gain of said MLE methods.

In the first embodiment a QR factorization is used. The channel matrix is partitioned to sub-matrices, wherein the dimension of each sub-matrix is reduced in order to enable a reduced complexity ML computation.

Alternatively, in the second embodiment of the present invention WB factorization is used. The channel matrix complexity is algebraically reduced in order to perform a simplified Maximum Likelihood (ML) detection.

Figure 1:
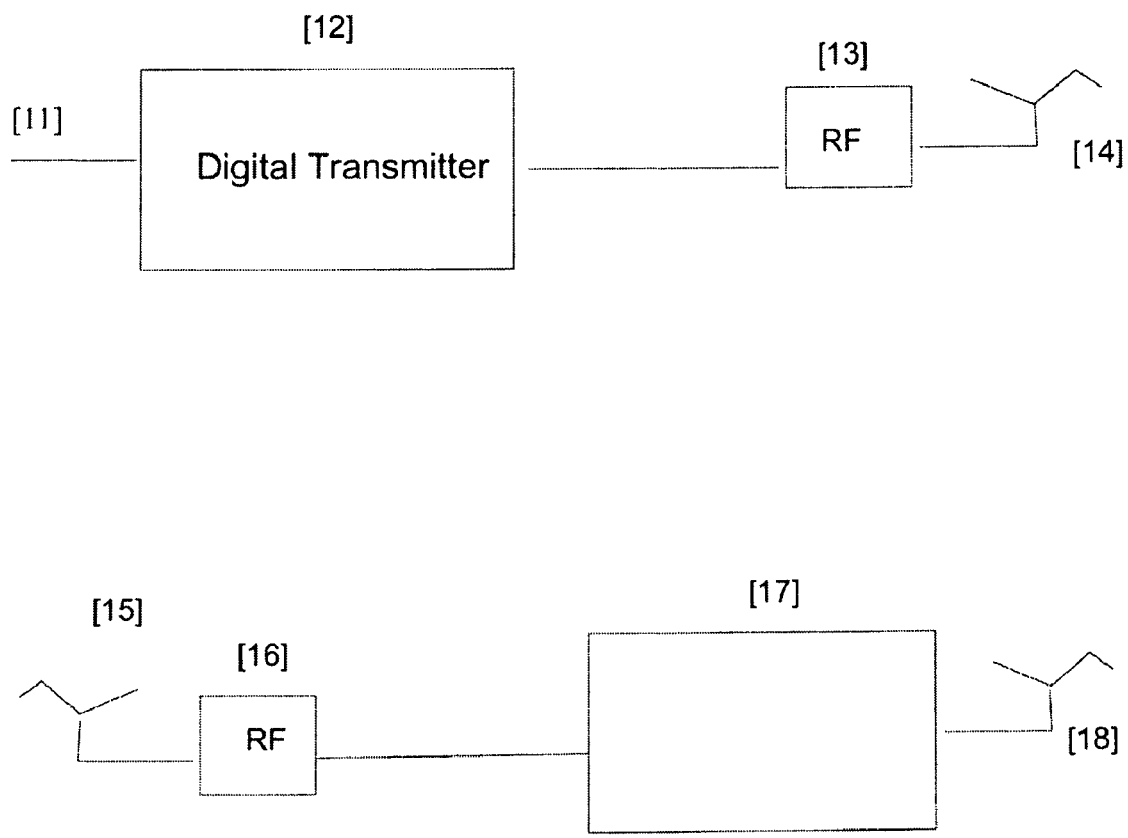
FIG. 1 is an illustration of a wireless prior art SISO transmitter/receiver system.

FIG. 1 is an illustration of a wireless prior at SISO transmitter/receiver system, provided for a transmission of a single signal using a single transmit antenna and a single receiver. The prior art SISO transmitter comprises a Digital Transmitter [12], which translates an incoming bit-steam [11] into an analog signal (e.g. Intermediate Frequency (IF) or base band signal), a Radio Frequency (RF) up-converter [13] module and a transmit antenna [14], which transmits the RF signal generated by said RF up-converter. The prior art SISO receiver is comprised of a receive antenna [15], RF down-converter module [16] and a Digital Receiver [17], which translates the signal into an output bit-stream [18].

Figure 2:
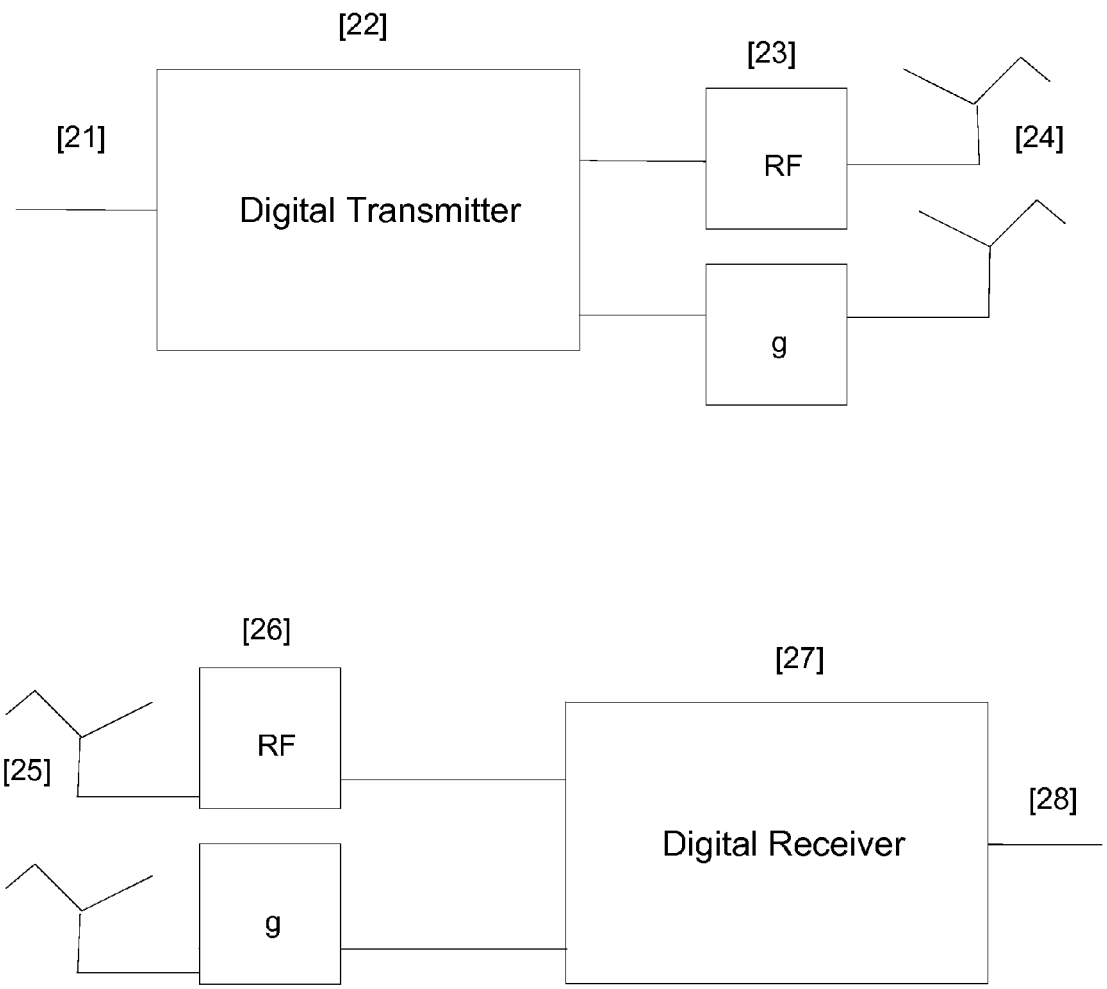
FIG. 2 is an illustration of a wireless prior art MIMO transmitter/receiver system.

FIG. 2 is an illustration of a wireless prior art MIMO transmitter/receiver system, provided for a transmission of multiple signals using multiple transmit antennas and multiple receivers. The prior art MIMO transmitter comprises: a Digital Transmitter [22], which converts the incoming bit stream [21] into a plurality of K analog signals, a plurality of K RF up-converters [23] modules, which convert said K corresponding analog signals into RF signals, and a plurality of K transmit antennas [24], which aim to transmit said plurality of K RF signals. A prior art MIMO receiver comprises a plurality of N receiver antennae [25], which aim to receive a combination of said K plurality transmitted RF signals, a plurality or N RF down-converter modules [26], which translate said received RF signals into analog signals, and a Digital Receiver [27], which translates said N analog samples into an outgoing digitized bit-stream [28]. Said bit-stream is defined by—r=Ht$_i$+n.

where r=(r$_1$, . . . , r$_N$) is the received signal, H is the channel coefficients matrix, t=(t$_1$, . . . , t$_K$)$^T$ is a column vector of transmitted signals determined according to a predefined alphabet and corresponding modulation method (e.g. QAM, PAM, PSD etc.), and n=(n$_1$, . . . , n$_N$) is the noise vector of each receiver.

Figure 3:
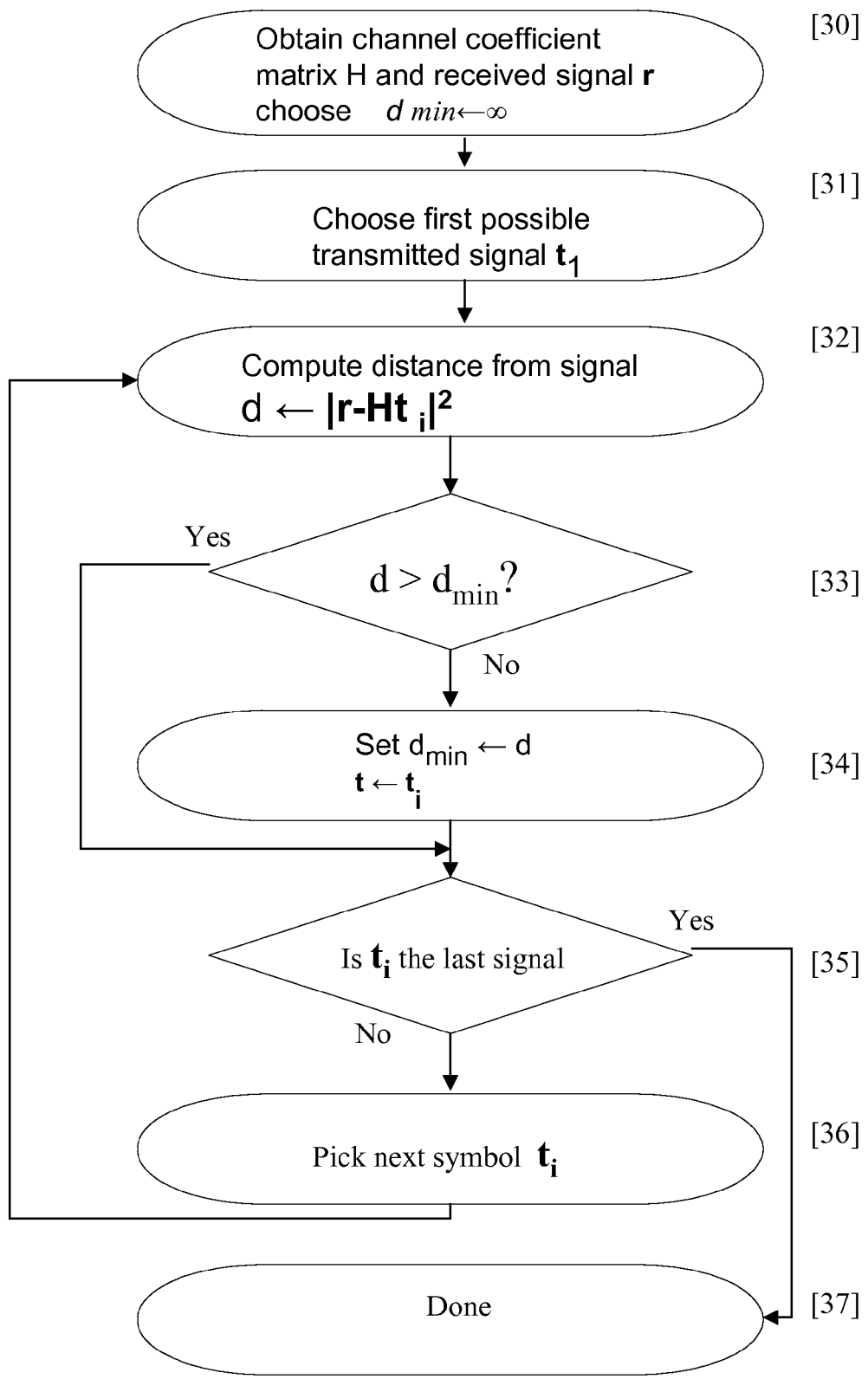
FIG. 3 is a flow chart describing the different steps to be performed by the joint Maximum Likelihood detection method.

FIG. 3 describes the steps to be performed by the prior art ML detection method. The objective of this method is to find the most likely transmitted signal in terms of Euclidian distance:

$$\max_i Pr(r \mid t_i) = \min_i \|r - Ht_i\|^2$$

At the initialization step [30], the channel coefficient matrix H is obtained by using a known training sequence or a blind estimation method. Additionally, the received-signal vector r is obtained through sampling of the analog signals as defined by—r=Ht$_i$+n. The variable d$_{min}$ is initialized to infinity, said variable defining the minimum existing distance blown to the algorithm between the current hypothesized transmitted signal propagated through the channel Ht$_i$ and the received signal r. Next, the first possible transmitted signal in the system t$_i$ is identified [step 31]. The receiver computes the current distance d of the received-signal vector r from the current hypothesized signal propagated through the channel Ht$_i$. The current distance d is computed using the equation [step 32]:

$$d=\|r-Ht_i\|^2$$

The current distance d is tested against the existing d$_{min}$ [step 33]. In case the receiver has detected a more likely hypothesis (i.e. d$_{min}$ is larger than d), the variable d$_{min}$ is set to the current d and the variable t̂ is set to the associated transmitted signal t$_i$ [step 34]. If d$_{min}$ is smaller than d than step [34] is skipped. At the next step [35] the receiver checks whether said transmitted signal t$_i$ is the last signal. If the latter statement is false, the receiver chooses the following transmitted signal t$_{i+1}$ [step 36] and returns on steps [32] through [35]. Otherwise, the ML detection method described above is completed [37] and the variable t̂ is defined as the estimated transmitted signal.

Figure 4:
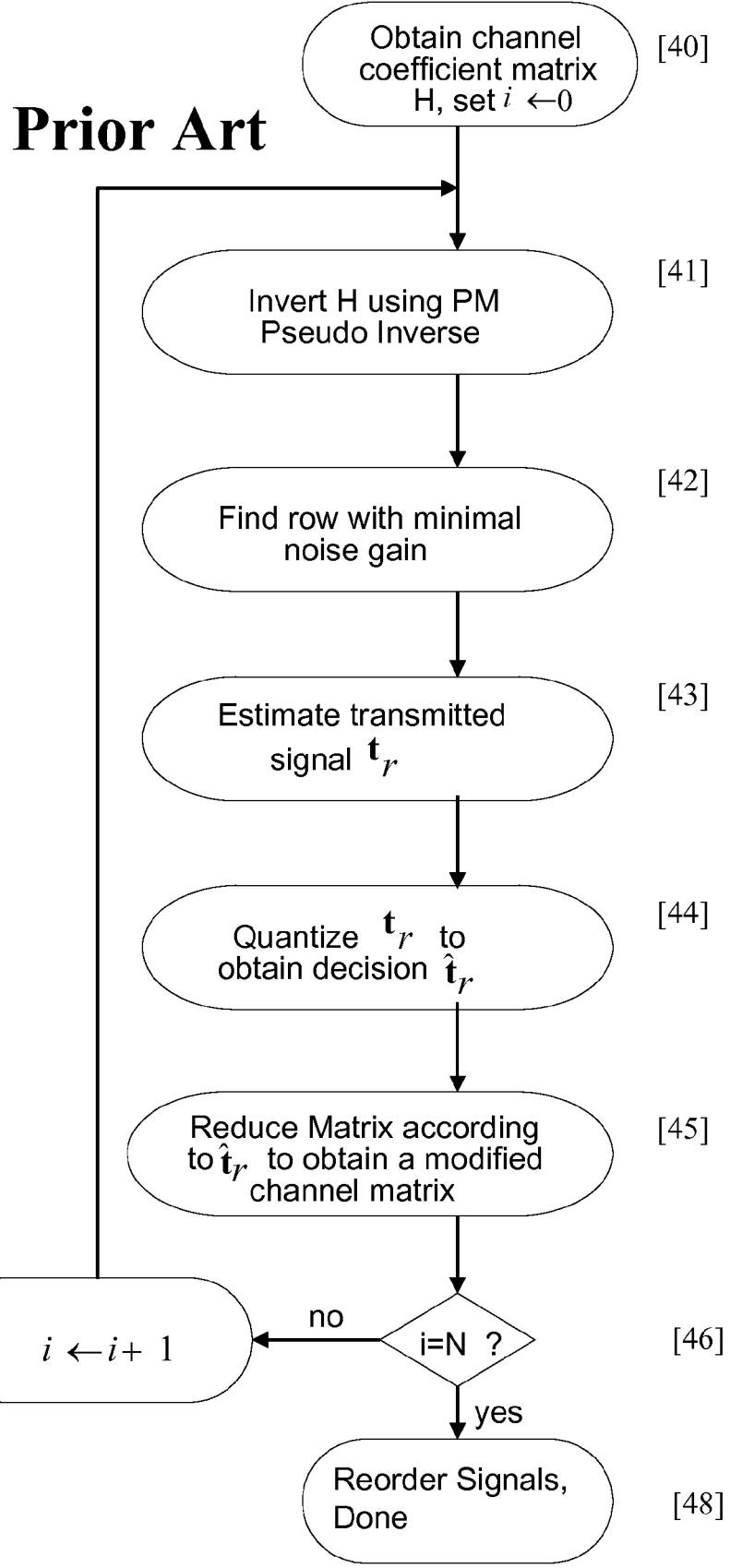
FIG. 4 is a flow chart describing the different steps to be performed by the BLAST iterative decoding method.

FIG. 4 illustrates the steps to be performed by the prior art BLAST iterative decoding method. The objective of this method is to reduce the complexity in prior art maximum likelihood techniques by decoding a single or a one-dimensional transmitted signal. Assuming the chosen estimated one-dimensional transmitted signal was actually transmitted, a reduced channel matrix is obtained by removing the effect of the hypothesized one-dimensional transmitted signal from the received-signal vector r and from the channel coefficients matrix H. This procedure is iterated over all one dimensional transmitted signals according to their order, said order determined by the signal's noise gain. At the initiation step [40], the channel coefficient matrix H is obtained by using a known training sequence or a blind estimation method. Additionally, the received-signal vector r is obtained through sampling of the analog signals. Next, said channel matrix H is inverted using the Penrose-Moore pseudo inverse technique [step 41]. The receiver finds row $h_i$ which has the minimal noise gain within the inverted channel matrix i'th row [step 42]. It then proceeds to identify the associated one-dimensional estimated transmitted signal $t_i$ [step 43]. Said estimated transmitted signal $t_i$ is obtained by multiplying the minimal noise gain inverted row $h_i$ with the received vector r. The estimated signal $t_i$ is then quantized in order to obtain the signal defined by $\hat{t}_i$ it [step 44]. To obtain a modified channel matrix, said matrix is reduced by zeroing the i'th column and subtracting from each element of r the contribution from the estimated transmitted signal $\hat{t}_i$ $$r^{(i+1)} = r^{(i)} - h_i \hat{t}_i$$

At the last step, the system checks whether all the one-dimensional transmitted signals are estimated [step 46]. If the latter is false, the receiver chooses the following received signal $r^{(i+1)}$ [step 47] and repeats steps [41] through [46]. Otherwise, the BLAST method described above is completed [step 48].

Figure 5:
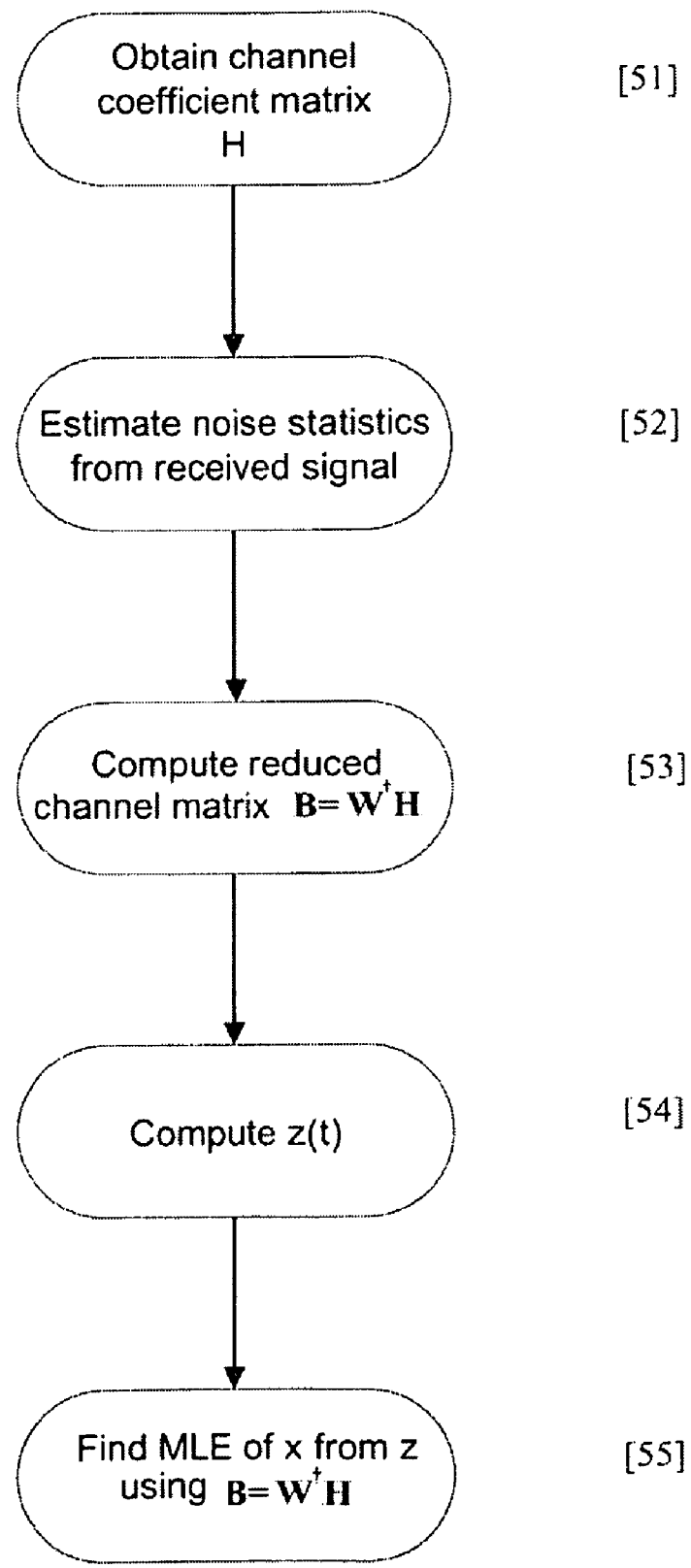
FIG. 5 is a flow chart describing the general steps to be performed according to the first embodiment.

FIG. 5 describes the steps to be performed according to the first embodiment, said embodiment using the ML search algorithm. A radio frequency front-end receives the plurality of transmit signals. The received signals are then digitized and transferred to the digital receiver block. At step [51] the channel coefficients matrix H is obtained from the received signal. Noise statistics is then estimated and concluded from the received signal [step 52]. The reduced channel matrix B=W*H is received through computation of algebraic reduction on the matrix H [step 53], wherein the reduced channel matrix B is supplemented with r non-zero diagonals, W is the Partial Equalization matrix and W* is the Hermitian conjugate (transpose matrix of the complex conjugates) of the said matrix W. For each sampled received signal vector x a reduced-received vector z is computed [step 54], wherein said vectors are reduced according to the bandwidth b of the reduced channel matrix B. Said computation is applied according to the equation $$z = W^* x = Bt + W^* n,$$

where $z=(z_1, \ldots, z_N)$ is the reduced-received vector, $t=(t_1, \ldots, t_N)^T$ is the transmitted signal vector and n is the random additive noise vector, which may include other interfering signals. Since in most circumstances a dimension reduction is applied using the matrix W by projecting the received signal onto the "signal subspace", we may assume that the size of the reduced channel matrix B is K×K. The Maximum Likelihood estimation of the transmitted signal vector t is calculated from the reduced-received vector z [step 55].

Figure 6:
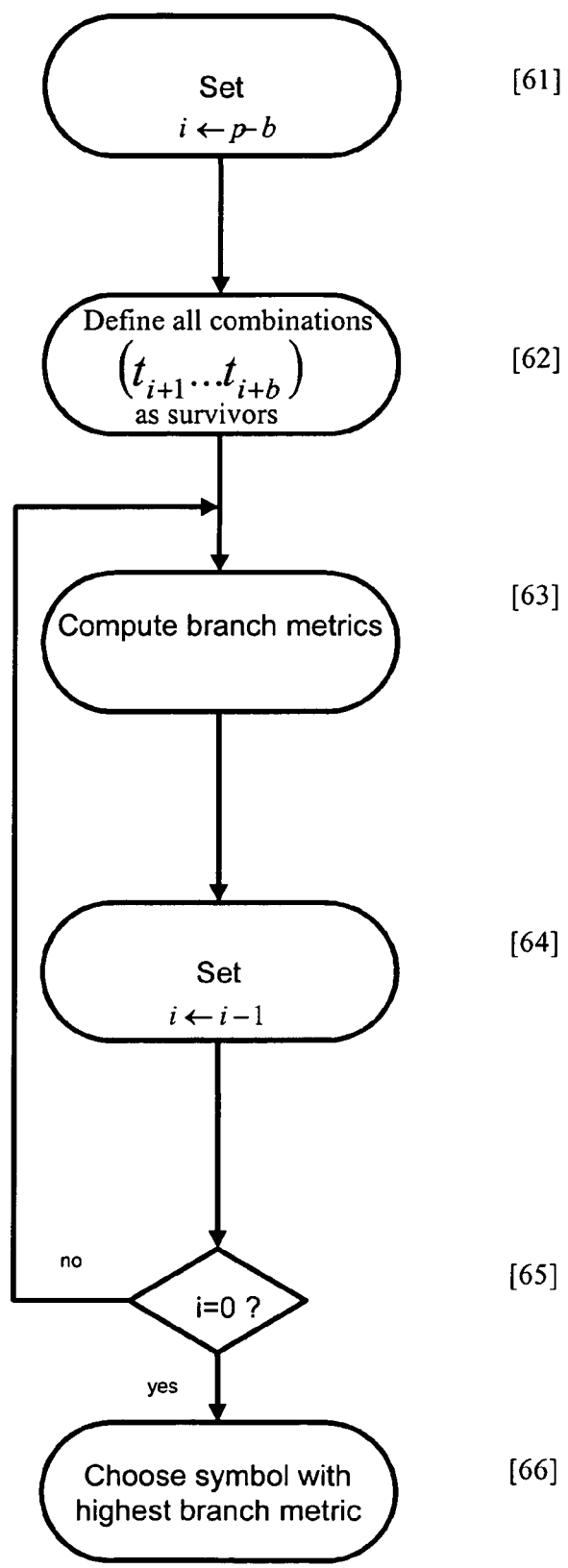
FIG. 6 is a flow chart describing the different steps to be performed by the reduced complexity Maximum Likelihood search algorithm according to the first embodiment.

FIG. 6 describes the steps to be performed by the reduced complexity Maximum Likelihood search algorithm for receiving an estimation of the transmitted signals vector t, as suggested by the first embodiment. Define N to be the number of receive antennae, b the bandwidth of the reduced channel matrix B, |A| the size of predetermined alphabet symbols. i.e. the number of different transmitted signals. Set the index i to be i=N−b [step 61]. Define all possible combinations of the transmitted signals $(t_{i+1}, \ldots, t_{i+b})$ as survivor branches [step 62]. For each possible value of transmitted signals $(t_i, \ldots, t_{i+b-1})$ and for each one of the |A| survivor branches $(t_{i+1}, \ldots, t_N)$ that contain the sub-sequence of transmitted symbols $(t_{i+1}, \ldots, t_{i+b-1})$ compute the branch metric as follows [step 63]—

$$L(z_1, \ldots, z_N | t_i, \ldots, t_N) = L(z_{i+1}, \ldots z_N | t_{i+1}, \ldots t_N) + L(z_i | t_i, t_{i+1}, t_{i+b-1}),$$

where L is the log function on said metric computation. The total procedure iteration amounts to $|A|^{b+1}$ likelihood computations. In addition, said procedure provides a likelihood value and a branch of transmitted signals, both defined by the transmitted signals $(t_i, \ldots, t_{i+b-1})$ for each of the $|A|^b$ possible values of the survivor branch. In the next step [64], set i←i−1. If i=0 [step 65] proceed onto the last step of the algorithm—choose the transmitted signals along the survivor branch with the highest likelihood, i.e. highest branch metric [step 66]. Otherwise, repeat steps [63] through [65]. The computational complexity of the proposed ML search algorithm is $(N-b+1) \cdot |A|^{b+1}$. Hence, a family of algorithms is obtained depending on the value of b. Said algorithms vary from the lowest complexity of $(N-1)|A|^3$, wherein WB factorization is obtained and B is a bi-diagonal reduced channel matrix, to the highest complexity of maximum likelihood, wherein no decomposition may be performed. The proposed algorithm is highly efficient when high-order modulation is required, e.g. 64-QAM.

Figure 7:
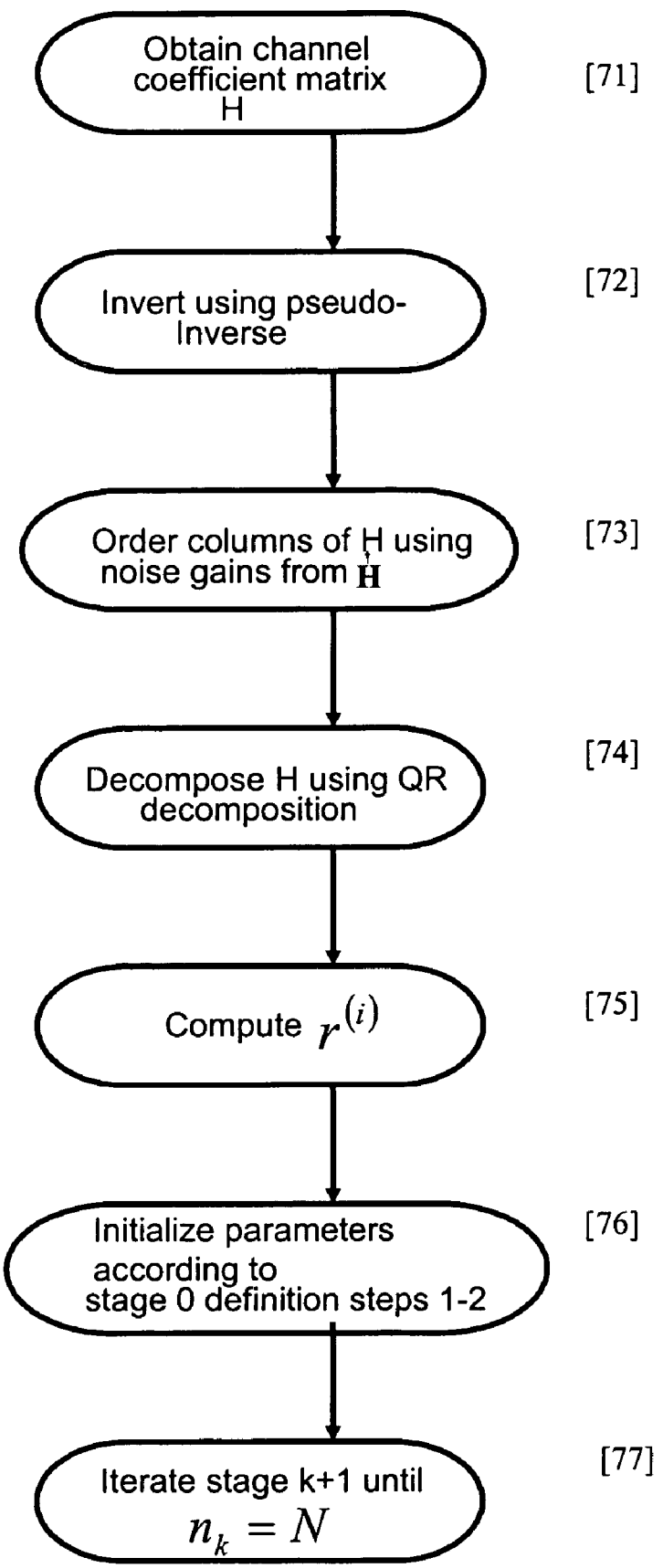
FIG. 7 is a flow chart describing the general steps to be performed according to the second embodiment.

FIG. 7 describes the steps to be performed according to the second embodiment, said embodiment using the QR factorization algorithm. At the initialization step [71], the channel coefficient matrix H is obtained by using a known training sequence or a blind estimation method. The noise gain of each channel matrix column permutation $NG_i$ is estimated using Moore-Penrose generalized inverse method [step 72] as follows:

$$NG_i = \sum_{i=0}^{N-1} H_{i,k}^{\uparrow} \quad k=0, \ldots, K-1,$$

where K is the number of transmitted signals and N is the number of received signals in the system. The $NG_i$s are then sorted in decreasing order and the columns of H are reordered using said order of noise gain parameters $NG_i$ to obtain the matrix $\hat{H}$ [step 73]. Next, set $\hat{H}=QR$ [step 74]. A unitary matrix Q and a right upper triangular matrix R are obtained by using QR decomposition on the matrix $\hat{H}$. A received signal vector $r^{(0)}$ is obtained from the Hermitian conjugate of the matrix Q by defining $r^{(0)}=Q^*r$ [step 75]. A sequence of right upper triangular matrices $R^{(k)}$ are defined, wherein a partition of $R^{(k)}$ into 4 sub-matrices by is defined by—

$$R^{(k)} = \begin{bmatrix} R_{11}^{(k)} & R_{12}^{(k)} \\ R_{21}^{(k)} & R_{22}^{(k)} \end{bmatrix}$$

The dimensions of the matrices $R_{11}^{(k)}, R_{12}^{(k)}, R_{21}^{(k)}, R_{22}^{(k)}$ are $(N-n_k) \times (N-n_k)$, $(N-n_k) \times n_k$, $n_k \times (N-n_k)$, $n_k \times n_k$ respectively, where $n_k$ is the number of decoded symbols at the end of stage k initialized to zero, N is the number of reception elements and M is the number of estimated transmitted signals.

$r^{(k)}$ is obtained though the following algorithm:
1. Set the overlap parameter $\Delta$. [step 76]
2. At stage k=0
   a. $R^{(k)}=R$. Note that by definition $R_{21}^{(k)}=0$.)
   b. Set $n_k=0$
   c. Set $r^{(0)}=Q^*r$
3. At stage k+1. [step $77_{k+1}$]
   a. Set $n_{k+1}=n_k+M-\Delta$.
   b. Define a new partition of $R^{(k)}$ $$R^{(k)} = \begin{bmatrix} S_{11}^{(k)} & S_{12}^{(k)} \\ S_{21}^{(k)} & S_{22}^{(k)} \end{bmatrix},$$

where $S_{11}^{(k)}$, $S_{12}^{(k)}$, $S_{21}^{(k)}$, $S_{22}^{(k)}$ are matrices of sizes $(N-n_{k+1}-\Delta)\times(N-n_{k+1}-\Delta)$, $(N-n_{k+1}-\Delta)\times(n_{k+1}+\Delta)$, $(n_{k+1}+\Delta)\times(N-n_{k+1}-\Delta)$, $(n_{k+1}+\Delta)\times(n_{k+1}+\Delta)$ respectively.
   c. Find a maximum likelihood estimation for the problem subject to the constrain $u\uparrow n_k=t^{(k)}$ $$\min_u \|S_{22}^{(k+1)}u - r^{(k+1)}\uparrow n_{k+1}\|^2$$

where $\uparrow n_k$ denotes restriction to the last $n_k$ coordinates of $t^{(k)}$.
   d. Set $t^{(k+1)}=u\uparrow n_{k+1}$
   e. Define a partition of $R^{(k)}$ by $$R^{(k)} = \begin{bmatrix} R_{11}^{(k)} & R_{12}^{(k)} \\ R_{21}^{(k)} & R_{22}^{(k)} \end{bmatrix},$$

where $(N-n_{k+1})\times(N-n_{k+1})$, $(N-n_{k+1})\times n_{k+1}$, $n_{k+1}\times(N-n_{k+1})$, $n_{k+1}\times n_{k+1}$ are the dimensions of the matrices $R_{11}^{(k)}$, $R_{12}^{(k)}$, $R_{21}^{(k)}$, $R_{22}^{(k)}$ respectively.
   f. Define $$r^{(k+1)} = r^{(k)} - \begin{bmatrix} R_{12}^{(k)} \\ R_{22}^{(k)} \end{bmatrix} t^{(k+1)}.$$

g. Set $$R^{(k+1)} = \begin{bmatrix} R_{11}^{(k)} & 0 \\ 0 & I \end{bmatrix}$$

h. If $n_{k+1}<N$ repeat step 3 with k+2.

Figure 8:
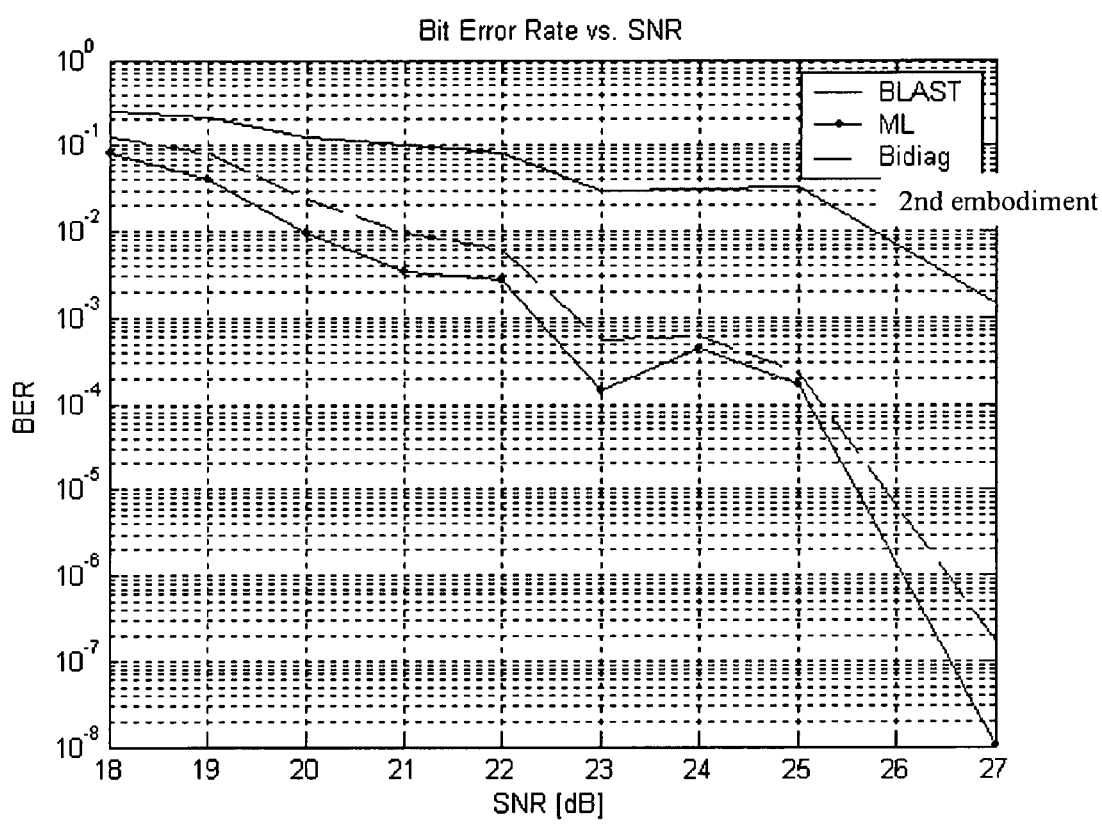
FIG. 8 is a graphical illustration of the Signal to Noise Ratio versus Bit Error Rate. Said illustration compares the performance between the second preferred embodiment, a ML receiver and a BLAST receiver.

FIG. 8 is a graphical illustration of the Signal to Noise Ratio (SNR), x-axis, versus Bit Error Rate, y-axis. Said illustration compares the performance between the second preferred embodiment, the prior art ML receiver and the prior art BLAST receiver. All three receivers are concatenated with a Viterbi decoder based on the IEEE 802.11a convolution code and employ a 3×3 MIMO system over a Rayleigh fading channel. Although the Maximum Likelihood detection method outperforms the second preferred embodiment, said ML detection is by fax more complex to implement and becomes computationally infeasible as the number of antennae increase. In contrast, the advantage of the proposed invention (middle line) over the prior art BLAST method (upper line) is clearly shown.

The criteria for determining M transmitted signals, as described above, is by the Maximum Likelihood estimation method. In addition, the maximum a-posteriori probability method can be used, said method providing an estimating according to the location of the signal having the maximum a posteriori density. In both embodiments of the invention the process can be further simplified through a reduced state sequence estimation of the low dimensional ML estimation (which is similar to reduced state sequence estimation (RSSE) methods), wherein only some of the sequence states are used.

While the above description contains many specificities, these should not be construed as limitations on the scope of the invention, but rather as exemplifications of the preferred embodiments. The modulation technique according to the MIMO system described above may be a multi-carrier modulation, e.g. DMT, OFDM, OFDMA, a single-carrier modulation, e.g. QAM, PAM, PSK, MSK, GMSK, as well as a spread-spectrum modulation, e.g. FH-SS, DSSS. The proposed MIMO system provides a transmission band, wherein said transmission band is the Unlicensed National Information Infrastructure (UNII band) or the Industrial Scientific and Medical band (ISM). Those skilled in the art will envision other possible variations that are within its scope.

What is claimed is:

1. A method of obtaining a plurality of received signals in a Multiple Input Multiple Output (MIMO) system with K transmission elements and N reception elements, wherein N≧K (N>2, K>1), said method comprising:
   obtaining a channel coefficients matrix H;
   obtaining a plurality of K transmission channels;
   decomposing the channel coefficients matrix H using WB factorization, wherein W is a partial equalization matrix, chosen such that decomposing the channel coefficients matrix H results in a decomposed matrix B that is supplemented with a plurality of non zero diagonals exhibiting a bandwidth b; and
   running an iterative process for obtaining K received signals while applying a Maximum Likelihood Estimation (MLE) algorithm on all sub-sequence combinations of K transmitted signals according to a transmitted signal vector propagated through the decomposed channel coefficients matrix B and wherein at each iteration stage, i (i={0 . . . K}), a likelihood value is calculated and updated in accordance with a single reduced received signal of index K−i calculated from combination of b transmitted signals of indices i to i+b−1 and a sub-sequence of reduced received signals of indices K−i+1 to K calculated from the combination of transmitted signals of matching indices.

2. The method according to claim 1 wherein the MIMO system uses a wireless connection.

3. A method of obtaining a plurality of received signals in a Multiple Input Multiple Output (MIMO) system with K transmission elements and N reception elements wherein N≧K (N>2, K>1), said method comprising:
   A. obtaining a channel coefficients matrix H;
   B. obtaining a plurality of K transmission channels and sorting thereof according to a first set of criteria;
   C. rearranging said channel coefficient matrix according to the obtained order of said transmission channels;
   D. decomposing said channel coefficients matrix H using a decomposition process using WB factorization, wherein W is a partial equalization matrix, chosen such that decomposing the channel coefficients matrix H results in a decomposed matrix B that is supplemented with a plurality of non zero diagonals exhibiting a bandwidth b;

E. defining first partition matrices obtained from said decomposed channel coefficients matrix; and F. obtaining K received signals according to best combination of M estimated transmitted signals (M<K, M>1) of said decomposed channel coefficients matrix by applying an iterative process, wherein at each iteration is determined best combination of L out of M (L≦M) estimated transmitted signals of said partition matrices are determined according to second set of criteria and subtracting the effect of estimated signal from the received signal r and re-partitioning matrices according to determined L transmitted signals.

4. A method of simultaneously decoding a plurality of transmitted signals in a multiple input multiple output (MIMO) system having K transmission elements and N reception elements wherein N≧K (N>2, K>1) thereby providing a reduced complexity approximation of optimal maximum likelihood estimation of MIMO decoding, the method comprising:

receiving a plurality of transmit signals;

sampling the plurality of the received signals resulting in sampled received vectors;

obtaining a channel coefficients matrix H from the sampled received vectors;

obtaining, through computation of algebraic reduction on the matrix H, a reduced channel matrix B having a bandwidth b, such that B=W'H, wherein B is supplemented with a plurality of non zero diagonals, and wherein W is a partial equalization matrix, and wherein W' is a Hermitian conjugate of the matrix W;

computing a reduced received vector z for each sampled received vector, wherein the sampled received vectors are reduced according to the bandwidth b of the reduced channel matrix B, such that z=W'x=Bt+W'n, wherein x is the sampled received signal vector, and wherein t is the transmitted signal vector and wherein n is a random additive noise vector;

setting i=N−b;

unless i=0, defining all possible combinations of the transmitted signals (ti+1, . . . , ti+b) in a trellis as survivor branches with corresponding metrics;

repeatedly decrementing i by 1 and for each possible value of transmitted signal (ti, . . . ti+b−1) and for each one of the survivor branches (ti+1, . . . , tN) that contain the subsequence of transmitted symbols (ti+1, . . . , ti+b−1), computing a corresponding branch metric (z1, . . . , zNti, . . . , tN) such that L(z1, . . . , zNti, . . . , tN)= L(zi+1, . . . zNti+1, . . . , tN)+L(ziti, ti+1, ti+b−1), wherein L is a log function;

when i reaches 0, choosing the transmitted signals along the survivor branch with the highest value of branch metric.

* * * * *